(12) United States Patent
Heikaus et al.

(10) Patent No.: US 12,441,034 B2
(45) Date of Patent: Oct. 14, 2025

(54) CAST COMPONENT THAT IS LARGER THAN THE CASTING MOLD

(71) Applicant: BASF Polyurethanes GmbH, Lemfoerde (DE)

(72) Inventors: Christian Matthias Heikaus, Lemfoerde (DE); Alexander Richter, Lemfoerde (DE)

(73) Assignee: BASF Polyurethanes GmbH, Lemfoerde (DE)

( * ) Notice: Subject to any disclaimer, the term of this patent is extended or adjusted under 35 U.S.C. 154(b) by 173 days.

(21) Appl. No.: 18/262,716

(22) PCT Filed: Jan. 7, 2022

(86) PCT No.: PCT/EP2022/050225
§ 371 (c)(1),
(2) Date: Jul. 24, 2023

(87) PCT Pub. No.: WO2022/161754
PCT Pub. Date: Aug. 4, 2022

(65) Prior Publication Data
US 2024/0424715 A1    Dec. 26, 2024

(30) Foreign Application Priority Data
Jan. 26, 2021  (EP) .................................. 21153474

(51) Int. Cl.
*B29C 39/02*     (2006.01)
*B29C 69/00*     (2006.01)
(Continued)

(52) U.S. Cl.
CPC .......... *B29C 39/028* (2013.01); *B29C 69/001* (2013.01); *B29C 2793/0027* (2013.01); *B29K 2075/00* (2013.01); *B29K 2105/041* (2013.01)

(58) Field of Classification Search
CPC ..... B29C 39/42; B29C 39/206; B29C 39/142; B29C 39/126; B29C 39/10; B29C 39/021; B29C 39/00; B29C 69/001; B29C 39/028
See application file for complete search history.

(56) References Cited

U.S. PATENT DOCUMENTS

| 1,220,072 A | 3/1917 | Cohen |
| 6,730,807 B1 | 5/2004 | Häberle et al. |

(Continued)

FOREIGN PATENT DOCUMENTS

| DE | 4318979 A1 | 12/1994 |
| DE | 19809634 A1 | 9/1999 |

(Continued)

OTHER PUBLICATIONS

European Search Report for EP Patent Application No. 21153474.8, Issued on Aug. 12, 2021, 3 pages.

(Continued)

*Primary Examiner* — Stella K Yi
(74) *Attorney, Agent, or Firm* — Grüneberg and Myers PLLC

(57) ABSTRACT

A component is made of at least two segments connected to one another in a movable manner via one or more connecting elements. The component is made of a casting or parts of a casting which is cast in the casting space of a casting mold. The component is longer than the maximum extent of that casting space when the component is aligned via the movable connecting element(s), such that it attains its maximum length L along an axis A. A process for producing the component is also provided.

14 Claims, 2 Drawing Sheets

(51) Int. Cl.
   *B29K 75/00*       (2006.01)
   *B29K 105/04*      (2006.01)

(56) References Cited

U.S. PATENT DOCUMENTS

| | | | |
|---|---|---|---|
| 9,982,735 B2 | 5/2018 | Thye-Moormann | |
| 2008/0258328 A1 | 10/2008 | Hansen et al. | |
| 2019/0270841 A1 | 9/2019 | Poppenberg et al. | |
| 2020/0009659 A1* | 1/2020 | Flögel | B29C 39/36 |

FOREIGN PATENT DOCUMENTS

| | | | |
|---|---|---|---|
| DE | 19821666 A1 | 11/1999 | |
| DE | 19821668 A1 | 11/1999 | |
| DE | 19954500 A1 | 5/2001 | |
| DE | 10004328 A1 | 8/2001 | |
| DE | 102005008263 A1 | 8/2006 | |
| EP | 1749597 A1 | 2/2007 | |
| EP | 3437819 A1 | 2/2019 | |
| GB | 1220072 A | 1/1971 | |
| WO | WO-2009/037207 A1 | 3/2009 | |
| WO | WO-2016/033307 A1 | 3/2016 | |
| WO | WO-2018/087387 A1 | 5/2018 | |
| WO | WO-2020/229698 A1 | 11/2020 | |

OTHER PUBLICATIONS

International Search Report for PCT Patent Application No. PCT/EP2022/050225, Issued on Apr. 11, 2022, 6 pages.
Prepelka, et al., "Reaction injection molding in the automotive industry", Journal of Cellular Plastics, vol. 11, Issue 2, Mar. 1975, pp. 87-98.
Ulrich Knipp, "Plastics for Automobile Safety Bumpers", Journal of Cellular Plastics, vol. 9, Issue 2, Mar. 1973, pp. 76-84.
International Preliminary Report on Patentability for PCT Patent Application No. PCT/EP2022/050225, Issued on Jan. 11, 2023, 15 pages.
Written opinion for PCT Patent Application No. PCT/EP2022/050225, Issued on Apr. 11, 2022, 6 pages.

* cited by examiner

Figure 1
Figure 1a
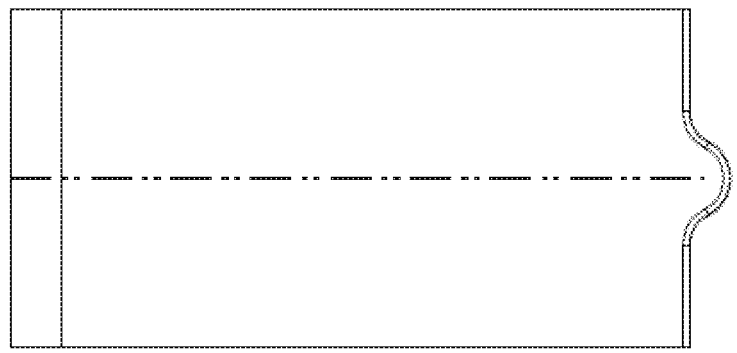
Figure 1b
Figure 1c
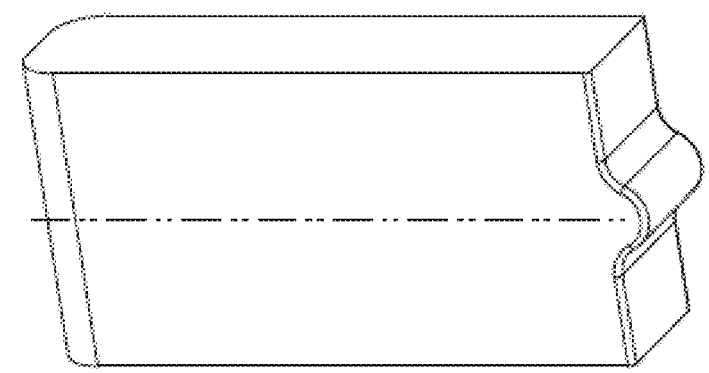

Figure 2
Figure 2a
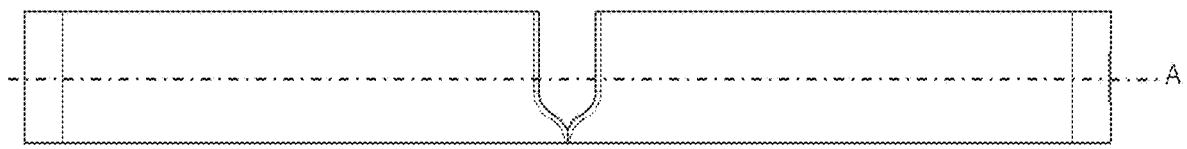
Figure 2b
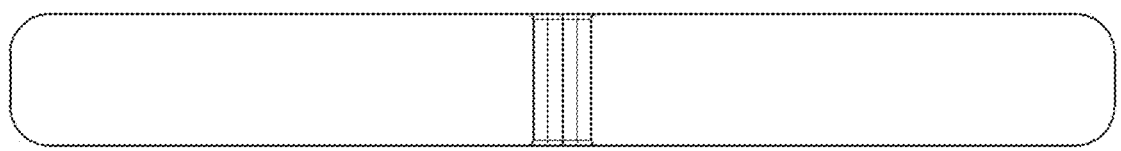
Figure 2c
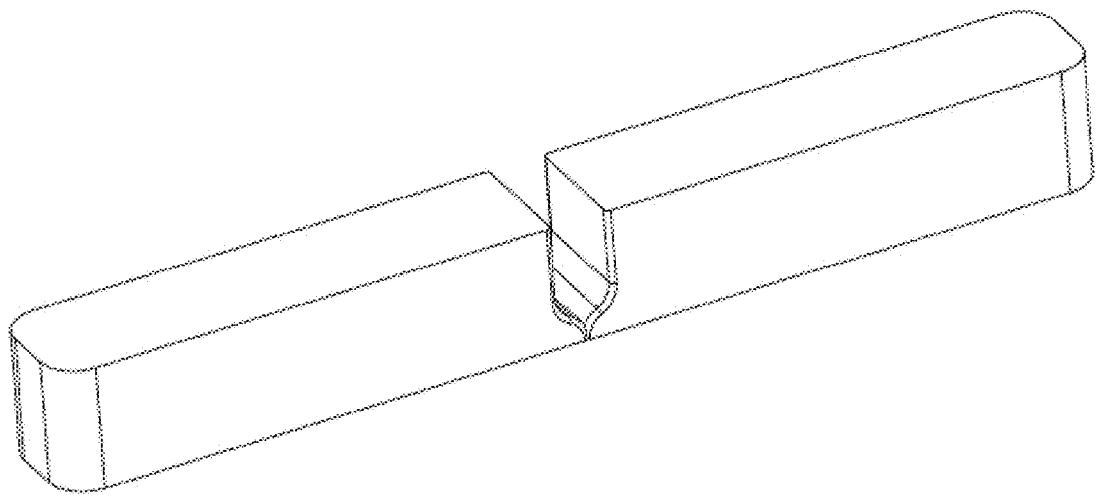

CAST COMPONENT THAT IS LARGER THAN THE CASTING MOLD

CROSS-REFERENCE TO RELATED APPLICATIONS

This application is the National Stage entry under § 371 of International Application No. PCT/EP2022/050225, filed on Jan. 7, 2022, and which claims the benefit of priority to European Application No. 21153474.8, filed on Jan. 26, 2021. The content of each of these applications is hereby incorporated by reference in its entirety.

The present invention relates to components that are longer than the maximum spatial extent of the casting space of the casting mold, and to the method of production thereof.

Casting of molded articles is a very efficient production method for components in high numbers, since it can be conducted in a highly automated manner. Production of castings with a wide variety of different profiles of requirements is known, for example, from DE 10 2005 008 263 A1 or else U.S. Pat. No. 1,220,072. However, there is sometimes a need for components that surpass the extent of the casting molds.

It was therefore an object of the present invention to create components from a casting such that the components are longer than the dimensions of the casting space.

This has been achieved, surprisingly, in that the castings are segmented and these segments are connected via movable connecting elements.

This invention thus provides a process for producing a casting according to claim 1, and to castings produced in this manner according to claim 13.

FIGURES

FIG. 1 shows a casting on which the component shown in FIG. 2 can be produced. FIG. 1a shows the side view of the casting with a bead which is semicircular in section and which remains after the casting has been cut to size along the dotted line as connecting element and hence connects the two segments that are formed by cutting the casting to size. FIG. 1b shows the casting with the protruding connecting element in top view, and FIG. 1c in a perspective view.

FIG. 2 shows the component produced from the casting shown in FIG. 1 by cutting it open along the dotted line therein, consisting of two segments that are connected to one another via the connecting element formed from the bead and folded out along the axis A such that the component reaches its maximum length L and was more than twice as long as the width of the casting shown in FIG. 1.

DETAILED DESCRIPTION

The subject matter of the invention, in an embodiment 1, is a process for producing a component consisting of at least two segments that are connected to one another via one or more connecting elements, preferably in a movable manner, wherein, in a first step, a casting is cast in a casting space of a casting mold and a) the casting comprises the connecting elements and segments of the component or b) the casting is processed after casting such that it comprises the connecting elements and segments of the component, and the component, in a second step, is bent at the connecting elements such that it reaches its maximum length L along an axis A and this maximum length L is longer than the maximum extent M of the casting space. By comparison with a component composed solely of individual segments, a component by the process of the invention from individual segments but connected by connecting elements has many advantages. It is frequently easier to handle for many fields of application. For example, compared to a component composed of 2 separate segments, the assembly of a component can be made simpler with connecting elements, since the component can be bonded, for example, in a connected manner, and as a result it is sometimes possible to dispense with multiple operations, for example of adhesive application. The connecting of the segments via connecting elements allows forces to be transmitted between the segments. If a component is being applied by adhesive bonding, this can be utilized, inter alia, for improvement of the adhesion of the edges of the segments in the region of the connecting elements. The connecting elements may also be utilized to release the load on the adjoining area.

The length of the connecting elements can be used to establish a defined distance between two segments, which, in particular, does not change even in a bonding operation.

The clearance that results from the connecting elements may be utilized, inter alia, for passage of cables or conduits.

The connecting elements themselves, and also the segments, may have various configurations. In preferred embodiments, connecting elements are round or ellipsoidal. In other preferred embodiments, the connecting elements are lamellar. The connecting elements may connect the segments in the middle of their abutting edges, but they may also be closer to one side of the segments. This may be an advantage, for example, when the segments are being adhesive-bonded to a surface. If the connecting elements are directly on the bonding surface, they can likewise be adhesive-bonded. This has the advantage that the segment composite has easier and better adhesive bondability to a surface. Especially when the connecting elements are in lamellar form and these lamellas are such that they can be bonded to the surface as well between the segments, this has advantages in preferred embodiments. Advantages are, for example, better adhesion of the segment composite, easier processibility, better protection of the bonding sites from penetration of soil or moisture.

The segments are configured by the process of the invention as required by the component. Opposite surfaces may be of identical or different form. Preferred segments of components have at least one flat surface that facilitates securing on a flat base. Other preferred embodiments are matched in terms of their surface configuration to their site of installation. In preferred embodiments, the segments comprise further configuration elements such as holes, for example for securing, embossments, surface configurations and the like.

The process is designed such that at least two segments are bonded to one another in a component via the connecting elements. However, the process may also be designed such that the component may also consist of more than 2 segments that are connected to one another via connecting elements. Segments connected via connecting elements are also referred to as segment composite.

In a preferred embodiment 2 of the process, which comprises all the features of embodiment 1 or of any of its preferred embodiments, the casting space of the casting mold, in the three spatial directions, has a maximum height h, a maximum width b and a maximum depth t, and the maximum length L of the component is subject to one of the following conditions:

$$L > \sqrt{b^2 + t^2}$$
$$L > \sqrt{b^2 + h^2} \text{ or}$$
$$L > \sqrt{t^2 + h^2}$$

In a preferred embodiment 3 of the process, which comprises all the features of embodiment 2 or of any of its preferred embodiments, and in which, moreover, the depth t is not more than the width b and the width b is not more than the height h, the maximum length L of the component is subject to the following condition:

$$L > \sqrt{b^2 + h^2}$$

In a preferred embodiment 4 of the process, which comprises all the features of embodiment 2 or of any of its preferred embodiments, the maximum length L of the component is additionally subject to the following condition:

$$L > \sqrt{b^2 + t^2 + h^2}$$

In a preferred embodiment 5 of the process, which comprises all the features of embodiment 1 or of any of its preferred embodiments, and the casting space of the casting mold, in the three spatial directions, has a maximum height h, a maximum width b and a maximum depth t, and the maximum length L of the component is at least twice as long as either the depth t, the width b or the height h.

In a preferred embodiment 6 of the process, which comprises all the features of embodiment 2 or of any of its preferred embodiments, and in which, in addition, the depth t is not more than the width b and the width b is not more than the height h, the maximum length L of the component is at least twice the height h.

The segment composites may also have many times the abovementioned maximum length, in that more than 2 segments connected via connecting elements are produced from one casting. It is possible here via appropriate configuration of the individual segments also to produce all possible intermediate lengths of the segment composite. In preferred embodiments, the individual segments and connection elements are produced uniformly. The segment composites may be adjusted in length in a simple manner, preferably by adjusting the length of the outer segments in the segment composite. This is generally the simplest way. Particular installation conditions may necessitate that, in preferred embodiments, various segments of a segment composite are of different shape and/or have different lengths.

In a preferred embodiment 7 of the process, which comprises all the features of any of the preceding embodiments or any of their preferred embodiments, the casting cast in the casting space already has segments and connecting elements. These segments and connecting elements preferably already correspond to those in the finished component. They may assume the specific form of the segments and connecting elements in the finished component in unprocessed form or by virtue of further processing operations. This production process has the advantage that the component is already ready for use without much additional work. It is of course not possible to avoid customary treatment such as the removing of casting edges or casting channels. For the purposes of inexpensive production, preference is given to a processing operation which requires with minimal additional operating steps after the casting. Nevertheless, it may be necessary to add to the removed casting individual configuration elements of the component that can been mounted in the casting mold only with a disproportionately high level of complexity, if at all. By way of example and with preference, mention is made here of holes, embossments, diecuts, or cutting-to-size, or combinations thereof.

In a preferred embodiment 8 of the process, which comprises all the features of any of the preceding embodiments 1 to 6 or any of their preferred embodiments, the individual segments or connecting elements, or segments and connecting elements, are obtained by cutting the casting to size. This production process has the advantage that production costs for the casting molds can be saved and the operation of filling the casting mold may possibly be configured to be faster than in the case of castings with fine limbs. At the same time, this embodiment automatically requires at least one additional operating step by comparison with embodiment 7, the readying of the casting.

The readying of the casting is also referred to as cutting-to-size. Cutting-to-size is understood to mean any manner of readying. Preferred cutting-to-size methods are cutting with a sharp article, also referred to as a cutting tool. Preferred cutting tools are knives, shears, tongs, saws, electric arcs, lasers, water jets or compressed air. Various cutting tools may be used in combination. A preferred cutting tool is the water jet. The advantage of the water jet is that the cut edge is very clean and hence there is virtually no overheating of the material. In addition, the use of the water jet opens up great shaping freedom.

Depending on the number of items and production costs, both embodiment 7 and embodiment 8 may be advantageous. In both embodiments, it is possible in principle to produce virtually any shape of the segments and connecting elements, as set out above.

In a preferred embodiment 9 of the process, which comprises all the features of the preceding embodiment 8 or of any of its preferred embodiments, the component has been produced from a rectangular casting. The rectangular casting has the advantage that it is producible in a very simple manner, and only very little waste of the material used arises in preferred readying forms of the component that are set out hereinafter.

In a preferred embodiment 10 of the process, which comprises all the features of the preceding embodiment 9 or of any of its preferred embodiments, the rectangular casting is readied to give preferably rectangular segments, preferably cut to size with a water jet, such that at least two segments remain connected via at least one connecting element. The rectangular segment shape in particular leads to a low level of waste in the readying operation from the rectangular casting. The section for production of the rectangular segments is preferably made parallel to one of the surfaces of the casting.

In a preferred embodiment 11 of the process, which comprises all the features of any of the preceding embodiments 8 to 10 or of any of their preferred embodiments, the connecting element projects from a surface of the otherwise rectangular casting. This projecting connecting element is also referred to as bead. In principle, it would also be possible to produce the connecting element by readying the preferably rectangular casting. Connecting elements that project from the otherwise rectangular main body, also referred to as beads, are easily producible, meaning that corresponding cutouts can be readily incorporated in the casting mold, and feature high mechanical strength. The later connecting element is preferably placed as a 3D bead above the edges of the sides of the segment that are to remain connected via the connecting element.

In a preferred embodiment 12 of the process, which comprises all the features of the preceding embodiment 11 or of any of its preferred embodiments, at least one connecting element is ellipsoidal or semicircular in a section at right angles to the surface of the casting. This has the advantage that such a bead shape is easily producible and particularly stable.

In principle, the component may consist of any castable material; preference is given to polymers. Preferred examples include acrylonitrile-butadiene-styrene (ABS), celluloid, rubber, polyamide (PA), polylactate (PLA), polybutylene terephthalate (PBT), polymethylmethacrylate (PMMA), polycarbonate (PC), polyethylene (PE), polyetherketone (PEK), polyethylene terephthalate (PET), polypropylene (PP), polystyrene (PS), polyurethane (PU), polyvinylchloride (PVC). Preference is given to polyamide, polyurethane and polystyrene. Preference is given to polyamide, polyurethane and polystyrene. Very particular preference is given to polyurethane. The materials may also be foamed. A particularly preferred foamed material is microcellular polyurethane.

The production of the polyurethanes is known; in particular, the production of the microcellular polyurethanes is described, for example, in WO 2009/037207, WO2016/033307 or else WO 2018/087387.

What is meant by "microcellular" in this connection is that the cells preferably have a diameter of 0.01 mm to 0.5 mm, more preferably of 0.01 mm to 0.15 mm.

The microcellular polyurethanes more preferably have at least one of the following material properties: a density to DIN EN ISO 1183-1 A between 200 and 1300 kg/m$^3$, preferably between 270 and 1200 kg/m$^3$, a tensile strength to DIN 53504 (in accordance with DIN EN ISO 527) of ≥20 N/mm$^2$, preferably >40 N/mm$^2$, more preferably between 20 and 80 N/mm$^2$, an elongation at break to DIN 53504 (in accordance with DIN EN ISO 527) of ≥200%, preferably ≥230%, more preferably between 300% and 700%, and/or a tear propagation resistance to DIN ISO 34-1 B (b) of ≥6 N/mm, preferably of ≥8 N/mm, more preferably ≥10 N/mm. In further-preferred embodiments, the microcellular polyurethane has two, further preferably three, of these material properties; particularly preferred embodiments have all four of the material properties mentioned.

The elastomers based on microcellular polyurethane are typically produced in a mold in which the reactive starting components are mixed and then reacted with one another. Molds that can be used here are generally conventional molds, for example metal molds, which by virtue of their shape ensure that the casting has the inventive three-dimensional shape.

The polyurethanes can be produced by well-known processes, for example by using the following starting materials in a single- or two-stage process:
(a) isocyanate,
(b) compounds reactive toward isocyanates,
(c) water
optionally in the presence of
(d) catalyst,
(e) blowing agents,
(f) auxiliary and/or additive.

The production of the microcellular polyurethanes is advantageously conducted at an NCO/OH ratio of 0.85 to 1.20, where the heated starting components are mixed and introduced into the casting mold in an amount corresponding to the desired molding density.

The castings have cured after up to 60 minutes.

The amount of the reaction mixture introduced into the casting mold is preferably such that the moldings obtained have the density already described.

The starting components are preferably introduced into the casting mold at a temperature of 15° C. to 120° C., preferably of 30° C. to 110° C. The degree of compaction for production of the castings is between 1.1 and 8, preferably between 2 and 6.

The microcellular polyurethane is appropriately produced by the "one shot" process with the aid of low-pressure methodology, or in particular by the reactive injection molding (RIM) technique, in open or preferably closed casting molds. The reaction is especially conducted with compaction in a closed casting mold. The reactive injection molding technique is described, for example, by H. Piechota and H. Röhr in "Integralschaumstoffe" [Integral Foams], Carl Hanser-Verlag, Munich, Vienna 1975; D. J. Prepelka and J. L. Wharton in Journal of Cellular Plastics, March/April 1975, pages 87 to 98, and U. Knipp in Journal of Cellular Plastics, March/April 1973, pages 76-84.

Isocyanates (a) used may be commonly known cycloaliphatic, aliphatic and/or aromatic polyisocyanates. Particularly suitable for production of the composite elements of the invention are aromatic diisocyanates, preferably diphenylmethane 2,2'-, 2,4'- and/or 4,4'-diisocyanate (MDI), naphthylene 1,5-diisocyanate (NDI), tolylene 2,4- and/or 2,6-diisocyanate (TDI), tetramethylenexylene 2,4-diisocyanate (TMXDI), 3,3'-dimethyldiphenyl diisocyanate, diphenylethane 1,2-diisocyanate, p-phenylene diisocyanate (PPDI), and/or (cyclo) aliphatic isocyanate, for example preferably hexamethylene 1,6-diisocyanate (HDI), dicyclohexylmethane 4,4'-, 2,4'- and 2,2'-diisocyanate (H12 MDI), 1-isocyanato-3,3,5-trimethyl-5-isocyanatomethylcyclohexane, and/or polyisocyanates, for example polyphenylpolymethylene polyisocyanates. The isocyanates may be used in the form of the pure compound, in mixtures and/or in modified form, as for example in the form of uretdiones, isocyanurates, allophanates or biurets, preferably in the form of reaction products containing urethane and isocyanate groups, referred to as isocyanate prepolymers. Preference is given to using optionally modified diphenylmethane 2,2'-, 2,4'- and/or 4,4'-diisocyanate (MDI), naphthylene 1,5-diisocyanate (NDI), tolylene 2,4-, 2,6-diisocyanate (TDI) and/or 3,3'-dimethyldiphenyl diisocyanate and/or mixtures of these isocyanates.

The isocyanate-reactive compound (b) has a statistical average of at least 1.8 and at most 3.0 Zerewitinoff-active hydrogen atoms, this number also being referred to as the functionality of the isocyanate-reactive compound (b) and indicating the amount of isocyanate-reactive groups in the molecule calculated theoretically for one molecule from a molar amount. The functionality is preferably between 1.8 and 2.6, further preferably between 1.9 and 2.2, and in particular 2. Especially preferred are polyesterdiols, preferably polycaprolactone, and/or polyetherpolyols, preferably polyetherdiols, more preferably those based on ethylene oxide, propylene oxide and/or butylene oxide, preferably polypropylene glycol. A particularly preferred polyether is polytetrahydrofuran (PTHF).

Particular preference is given to the polyesterols from the following group: copolyesters based on adipic acid, succinic acid, pentanedioic acid, sebacic acid or mixtures thereof and mixtures of 1,2-ethanediol and 1,4-butanediol, copolyesters based on adipic acid, succinic acid, pentanedioic acid, sebacic acid or mixtures thereof and mixtures of 1,4-butanediol and 1,6-hexanediol, polyesters based on adipic acid and 3-methyl-1,5-pentanediol and/or polytetramethylene glycol (polytetrahydrofuran, PTHF). Particular preference is given to copolyesters based on adipic acid and mixtures of ethane-1,2-diol and butane-1,4-diol or polyesters based on adipic acid, succinic acid, pentanedioic acid, sebacic acid, or mixtures thereof and polytetramethylene glycol (PTHF).

A further important constituent of microcellular polyurethane is water. Water acts as a blowing agent. It can be used on its own or with other blowing agents. Preference is given to using water as the sole blowing agent.

In order to accelerate the reaction, it is possible to add commonly known catalysts (e) to the reaction mixture both in the preparation of a prepolymer and, optionally, in the reaction of a prepolymer with a crosslinker component. The catalysts (e) may be added individually and also in a blend with one another. These are preferably organometallic compounds, such as tin (II) salts of organic carboxylic acids, e.g. tin (II) dioctoate, tin (II) dilaurate, dibutyltin diacetate and dibutyltin dilaurate, or bismuth salts, preferably of carboxylic acids; bismuth is preferably in the 2 or 3 oxidation state, especially 3. Carboxylic acids used are preferably carboxylic acids having 6 to 14 carbon atoms, more preferably having 8 to 12 carbon atoms. Examples of suitable bismuth salts are bismuth (III) neodecanoate, bismuth 2-ethylhexanoate and bismuth octanoate, and tertiary amines such as tetramethylethylenediamine, N-methylmorpholine, diethylbenzylamine, triethylamine, dimethylcyclohexylamine, diazabicyclooctane, N,N'-dimethylpiperazine, N-methyl,N'-(4-N-dimethylamino)butylpiperazine, N,N,N',N",N"-pentamethyldiethylenediamine or the like.

Further useful catalysts include: amidines, for example 2,3-dimethyl-3,4,5,6-tetrahydropyrimidine, tris(dialkylaminoalkyl)-s-hexahydrotriazines, especially tris(N,N-dimethylaminopropyl)-s-hexahydrotriazine, tetraalkylammonium hydroxides, for example tetramethylammonium hydroxide, alkali metal hydroxides, for example sodium hydroxide, and alkali metal alkoxides, for example sodium methoxide and potassium isopropoxide, and also alkali metal salts of long-chain fatty acids having 10 to 20 carbon atoms and optionally pendent OH groups.

Depending on the reactivity to be established, the catalysts (e) are employed in amounts of 0.001% to 0.5% by weight, based on the prepolymer.

It is optionally possible to use blowing agents (f) that are customary in polyurethane production. Suitable examples include low-boiling liquids which evaporate under the effect of the exothermic polyaddition reaction. Suitable liquids are those which are inert to the organic polyisocyanate and have boiling points below 100° C. Examples of liquids of this kind that are used with preference are halogenated, preferably fluorinated, hydrocarbons, for example methylene chloride and dichloromonofluoromethane, perfluorinated or partly fluorinated hydrocarbons, for example trifluoromethane, difluoromethane, difluoroethane, tetrafluoroethane and heptafluoropropane, hydrocarbons, for example n- and isobutane, n- and isopentane, and also the technical grade mixtures of these hydrocarbons, propane, propylene, hexane, heptane, cyclobutane, cyclopentane and cyclohexane, dialkyl ethers, for example dimethyl ether, diethyl ether and furan, carboxylic esters, for example methyl formate and ethyl formate, ketones, for example acetone, and/or fluorinated and/or perfluorinated tertiary alkylamines, for example perfluorodimethylisopropylamine. It is also possible to use mixtures of these low-boiling-point liquids with one another and/or with other substituted or unsubstituted hydrocarbons.

The most appropriate amount of low-boiling liquid for production of such cellular elastic moldings composed of elastomers comprising urea groups in bound form depends on the intended density to be achieved, and on the amount of water which is preferably used in addition. In general, amounts of 1% by weight to 15% by weight, preferably 2% by weight to 11% by weight, based on the weight of component (b), give satisfactory results. More preferably, exclusively water (d) is used as blowing agent.

In the inventive production of the molded articles, it is possible to use auxiliaries (g). These include, for example, commonly known surface-active substances, foam stabilizers, cell regulators, fillers, flame retardant, nucleating agents, oxidation retardants, stabilizers, antimicrobials, lubricating and demolding aids, dyes and pigments.

Useful surface-active substances include, for example, compounds used to promote homogenization of the starting materials and that optionally are also suitable for regulating the cell structure. Examples include emulsifiers, for example the sodium salts of castor oil sulfates or of fatty acids and salts of fatty acids with amines, for example diethylamine oleate, diethanolamine stearate, diethanolamine ricinoleate, salts of sulfonic acids, for example alkali metal or ammonium salts of dodecylbenzene- or dinaphthylmethanedisulfonic acid and ricinoleic acid; foam stabilizers, such as siloxane-oxyalkylene copolymers and other organosiloxanes, ethoxylated alkylphenols, ethoxylated fatty alcohols, paraffin oils, castor oil esters or ricinoleic esters, turkey red oil and peanut oil, and cell regulators, for example paraffins, fatty alcohols and dimethylpolysiloxanes. Also suitable for improving emulsifying action, cell structure and/or stabilization thereof are oligomeric polyacrylates having polyoxyalkylene and fluoroalkane radicals as side groups. The surface-active substances are typically employed in amounts of 0.01 to 5 parts by weight based on 100 parts by weight of the higher molecular weight polyhydroxyl compounds (b).

Fillers, in particular reinforcing fillers, are understood to mean the customary organic and inorganic fillers, reinforcers and weighting agents known per se. Specific examples include: inorganic fillers such as siliceous minerals, for example sheet silicates such as antigorite, serpentine, hornblendes, amphiboles, chrysotile, talc; metal oxides, such as kaolin, aluminum oxides, aluminum silicate, titanium oxides and iron oxides, metal salts such as chalk, barite and inorganic pigments, such as cadmium sulfide, zinc sulfide and also glass particles. Examples of useful organic fillers include: carbon black, melamine, expandable graphite, rosin, cyclopentadienyl resins and graft polymers.

Reinforcing fillers employed preferably include fibers, for example carbon fibers or glass fibers, particularly when a high heat resistance or very high stiffness is required, in which case the fibers may be provided with adhesion promoters and/or sizes.

The inorganic and organic fillers may be used individually or as mixtures and are incorporated into the reaction mixture typically in amounts of 0.5% by weight to 50% by weight, preferably 1% by weight to 30% by weight, based on the weight of the formation components (a) to (c).

Suitable flame retardants are, for example, tricresyl phosphate, tris(2-chloroethyl)phosphate, tris(2-chloropropyl) phosphate, tris(1,3-dichloropropyl)phosphate, tris(2,3-dibromopropyl)phosphate and tetrakis(2-chloroethyl) ethylenediphosphate.

Also usable for flameproofing of the cellular PU elastomers produced according to the invention, apart from the halogen-substituted phosphates already mentioned, are inorganic flame retardants such as red phosphorus, aluminum oxide hydrate, antimony trioxide, arsenic trioxide, ammonium polyphosphate and calcium sulfate or cyanuric acid derivatives, for example melamine, or mixtures of at least two flame retardants, for example ammonium phosphates and melamine, and optionally starch and/or expandable graphite. In general, it has been found to be appropriate to use 5 to 50 parts by weight, preferably 5 to 25 parts by weight, of the flame retardants or mixtures mentioned for every 100 parts by weight of the formation components (a) to (c).

Nucleating agents used may, for example, be talc, calcium fluoride, sodium phenylphosphinate, aluminum oxide and finely divided polytetrafluoroethylene in amounts of up to 5% by weight based on the total weight of the formation components (a) to (c).

Suitable oxidation retardants and heat stabilizers which may be added to the cellular PU elastomers of the present invention include, for example, halides of metals of group I of the periodic table, for example sodium halides, potassium halides, lithium halides, optionally combined with copper (I) halides, for example chlorides, bromides or iodides, sterically hindered phenols, hydroquinones, and also substituted compounds of these groups and mixtures thereof, which are preferably used in concentrations up to 1% by weight based on the weight of the formation components (a) to (c).

Examples of hydrolysis stabilizers are various substituted carbodiimides, such as 2,2',6,6'-tetraisopropyldiphenylcarbodiimide or carbodiimides based on 1,3-bis(1-methyl-1 isocyanatoethyl)benzene, as described for example in documents DE-A 19821668, DE-A 19821666, DE-A 10004328, DE-A 19954500, DE-A 19809634 or DE-A 4318979, which are generally used in amounts of up to 2.0% by weight, based on the weight of the formation components (a) to (c).

Lubricating and demolding agents, which are generally likewise added in amounts of up to 1% by weight, based on the weight of the formation components (a) to (c), are stearic acid, stearyl alcohol, stearic esters and stearamides, and also the fatty acid esters of pentaerythritol.

It is further possible to add organic dyes, such as nigrosin, pigments, for example titanium dioxide, cadmium sulfide, cadmium sulfide selenide, phthalocyanines, ultramarine blue or carbon black.

Further details regarding the abovementioned other customary auxiliaries and additives can be found in the technical literature.

In a preferred embodiment 13 of the process, which comprises all the features of any of the preceding embodiments or any of their preferred embodiments, the constituent consists of microcellular polyurethane.

A further part of the subject matter of this invention and embodiment 14 is a component that has been produced by a process according to any of the preceding embodiments 1 to 13 or any of its preferred embodiments.

The invention claimed is:

1. A process for producing a component comprising at least two segments
connected to one another via one or more connecting elements, the process comprising:
casting a casting in a casting space of a casting mold, wherein
the casting is processed after casting such that the casting comprises the one or more connecting elements and the at least two segments of the component, and
bending the component at the one or more connecting elements such that the component reaches a maximum length L along an axis A, and this maximum length L is longer than a maximum extent M of the casting space,
wherein the casting space of the casting mold, in three spatial directions, has a maximum height h, a maximum width b, and a maximum depth t, and
wherein the maximum length L of the component is subject to one of the following conditions:

$$L > \sqrt{b^2 + t^2},$$
$$L > \sqrt{b^2 + h^2}, \text{ or}$$
$$L > \sqrt{t^2 + h^2}.$$

2. The process according to claim 1, wherein the maximum depth t is not more than the maximum width b, and the maximum width b is not more than the maximum height h, and the maximum length L of the component is subject to the following condition:

$$L > \sqrt{b^2 + h^2}.$$

3. The process according to claim 1, wherein the maximum length L of the component is subject to the following condition:

$$L > \sqrt{b^2 + t^2 + h^2}.$$

4. The process according to claim 1, wherein the casting space of the casting mold, in three spatial directions, has a maximum height h, a maximum width b, and a maximum depth t, and
wherein the maximum length L of the component is at least twice as long as either the maximum depth t, the maximum width b, or the maximum height h.

5. The process according to claim 1, wherein the maximum depth t is not more than the maximum width b, and the maximum width b is not more than the maximum height h, and the maximum length L of the component is at least twice the maximum height h.

6. The process according to claim 1, wherein individual segments of the at least two segments or the one or more connecting elements, or the at least two segments and the one or more connecting elements, are obtained by cutting the casting to size.

7. The process according to claim 6, wherein the component has been produced from a rectangular casting.

8. The process according to claim 7, wherein the rectangular casting is cut to size to give rectangular segments such that at least two segments remain connected via at least one connecting element.

9. The process according to claim 8, wherein at least one of the one or more connecting element projects from a surface of the otherwise rectangular casting.

10. The process according to claim 9, wherein at least one of the one or more connecting elements is ellipsoidal or semicircular in a section at right angles to a bending plane.

11. The process according to claim 1, wherein the component consists of microcellular polyurethane.

12. A component, produced by the process according to claim 1.

13. A process for producing a component comprising at least two segments connected to one another via one or more connecting elements, the process comprising:
   casting a casting in a casting space of a casting mold, wherein
   the casting is processed after casting such that the casting comprises the one or more connecting elements and the at least two segments of the component, and
   bending the component at the one or more connecting elements such that the component reaches a maximum length L along an axis A, and this maximum length L is longer than a maximum extent M of the casting space,
   wherein the casting space of the casting mold, in three spatial directions, has a maximum height h, a maximum width b, and a maximum depth t, and
   wherein the maximum length L of the component is at least twice as long as either the maximum depth t, the maximum width b, or the maximum height h.

14. A process for producing a component comprising at least two segments connected to one another via one or more connecting elements, the process comprising:
   casting a casting in a casting space of a casting mold, wherein
   the casting is processed after casting such that the casting comprises the one or more connecting elements and the at least two segments of the component, and
   bending the component at the one or more connecting elements such that the component reaches a maximum length L along an axis A, and this maximum length L is longer than a maximum extent M of the casting space,
   wherein the component consists of microcellular polyurethane.

* * * * *